Aug. 31, 1965 P. AYERS 3,203,470
METHOD OF RAPIDLY COOLING SOLID BODIES
Filed July 1, 1963
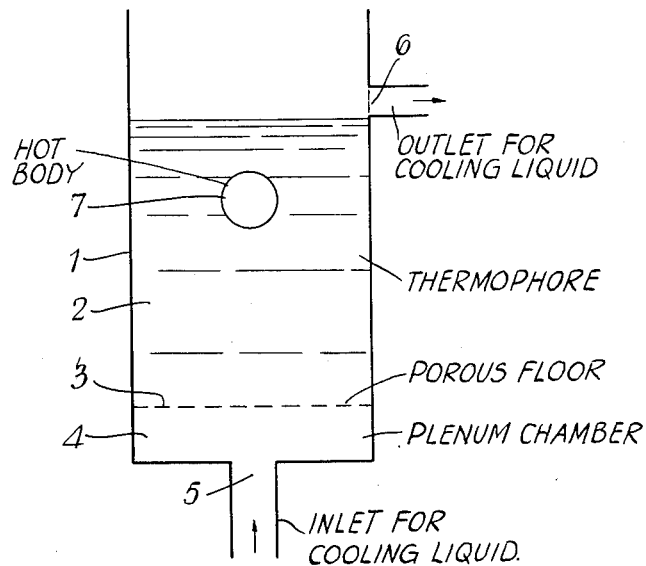
Inventor
Peter Ayers
By Pech & Pech
Attorneys 3,203,470
METHOD OF RAPIDLY COOLING SOLID BODIES
Peter Ayers, High Wycombe, England, assignor to The British Aluminium Company Limited, London, England, a company of Great Britain
Filed July 1, 1963, Ser. No. 292,101
1 Claim. (Cl. 165—1)

This invention relates to improvements in methods of rapidly cooling solid bodies.

In some applications it is highly desirable to extract heat as rapidly as possible from a solid body. This is usually accomplished either by quenching the hot body in a tank containing cold water or oil, or by directing a stream of cooling fluid onto the body. The disadvantage of this method from the point of view of rapid cooling, is that when the hot body is at a temperature considerably above the boiling point of the liquid, an adherent film of vapour is formed round the outside of the body. The thermal conductivity of this film is many times less than that of the liquid, hence the rate at which the hot body cools is very considerably reduced.

It is an object of the present invention to provide an improved method of rapidly cooling a solid body whereby the disadvantage referred to shall be materially reduced if not entirely obviated.

According to the present invention a method of rapidly cooling a solid body comprises exposing the body to a bed of particles fluidized by a cooling liquid.

The invention also extends to a method of heat treating a solid body which comprises heating the body to an elevated temperature and rapidly cooling the body by the method according to the immediately preceding paragraph.

I have found that the vapor film which tends to form around the body is decreased in thickness and that it tends to be broken up by the particles of the bed with the result that the rate of cooling is significantly increased.

The preferred cooling liquid is water because of its desirable thermal properties. It has a high latent heat of vaporization, a high thermal conductivity and a high specific heat. However, if water cannot be used for any reason, e.g. a corrosive effect on the hot body, then other liquids such as oils can be used although the cooling rates are less than can be obtained with water.

The drawing is a schematic illustration of an apparatus by which the method can be performed.

The particles of the bed can be of almost any solid material and have a preferred size range of between 0.5 mm. to 5 mm. Particles smaller than 0.5 mm. generally are not effective in breaking up the vapour film round the hot body, while particles greater than 5 mm. require high fluid flow rates to become fluidized, and then give poor quality fluidization. Particles of high density are preferred since with their greater kinetic energy they can more easily disrupt the insulating vapour film.

The term "solid body" is used herein to denote a body formed from a solid material and includes bodies which may be hollow or have a re-entrant surface. If the solid body is of a shape such that the fluidized particles can become trapped, or can rest on a flat surface, then the particles should have a melting point above the temperature of the hot solid body, otherwise they will fuse.

It should be noted that captive beds of finely divided solids are referred to in the art as "thermophore."

*Example*

A solid copper sphere 3 in. in diameter was heated to 800° C. and suddenly plunged into a bed of 1 mm. diameter lead shot fluidized with water at ambient temperature flowing at a rate of 100 gal./min. ft.$^2$ The temperature at the centre of the sphere was measured with a thermocouple which showed a fall in temperature from 800° C. to 500° C. in 4.6 seconds. The corresponding time for water alone flowing at the same rate was 6.6 seconds.

The accompanying drawing shows somewhat schematically a suitable apparatus for carrying out the process of the invention. A chamber 1 containing a bed 2 of finely divided solid particles, e.g. 1 mm. diameter lead shot, has a porous floor 3 defining a plenum chamber 4 to which a cooling liquid, e.g. water, is admitted under pressure through an inlet pipe 5. An overflow outlet 6 is provided for the cooling liquid and a solid body 7 is shown immersed in the bed 2 for cooling. The cooling liquid is fed under pressure to the plenum chamber 4, passes through the porous floor 3 on which the bed 2 is supported and flows upwardly through the bed 2 at a rate selected in relation to the mass of the particles to be sufficient to maintain the bed in a fluidized condition. The cooling liquid flows out of the bed through the outlet 6. The solid body 7 is plunged into the fluidized bed 2 where it is rapidly cooled. Any tendency for an insulating vapour film to form around the body 2 due to vapourisation of the cooling liquid is avoided due to the motion of the particles of the bed 2 which breaks up any such film.

What I claim:

A method of rapidly cooling a solid body from an elevated temperature which comprises immersing the body in a thermophore having a particle size of from 0.5 mm. to 5 mm., fluidizing the thermophore with a cooling water having a boiling point below said elevated temperature and flowing the cooling water through the thermophore at a rate selected in relation to the mass of the particles to maintain the thermophore in a fluidized condition and to impart a kinetic energy to the particles sufficient to disrupt the formation of a film of vaporized cooling water at the surface of the body.

References Cited by the Examiner
UNITED STATES PATENTS
3,075,580   1/63   Davis _____ 165—104 X
FOREIGN PATENTS
864,117   2/58   Great Britain.
OTHER REFERENCES Hassett: Developments in Applications of Fluidization, Chem. and Process Eng., V44, n3, March 1963 (pp. 127–31).

Hoffman, R. F. et al.: The Mechanics of Vertical Moving Fluidized Systems: IV. Application to Batch-Fluidized Systems With Mixed Particle Sizes, A.I. Ch. E., J. n2, V6, June 1960, TPI.A3 (pp. 321–4).

"Flow in Fluidized Reaction Systems" (Kiddoo), Chemical Engineering periodical May 1949 (pages 1–3 relied on).

ROBERT A. O'LEARY, *Primary Examiner.*

CHARLES SUKALO, *Examiner,*